J. M. McINTOSH.
BREAD RAISER.
APPLICATION FILED FEB. 19, 1908.
931,075.
Patented Aug. 17, 1909.
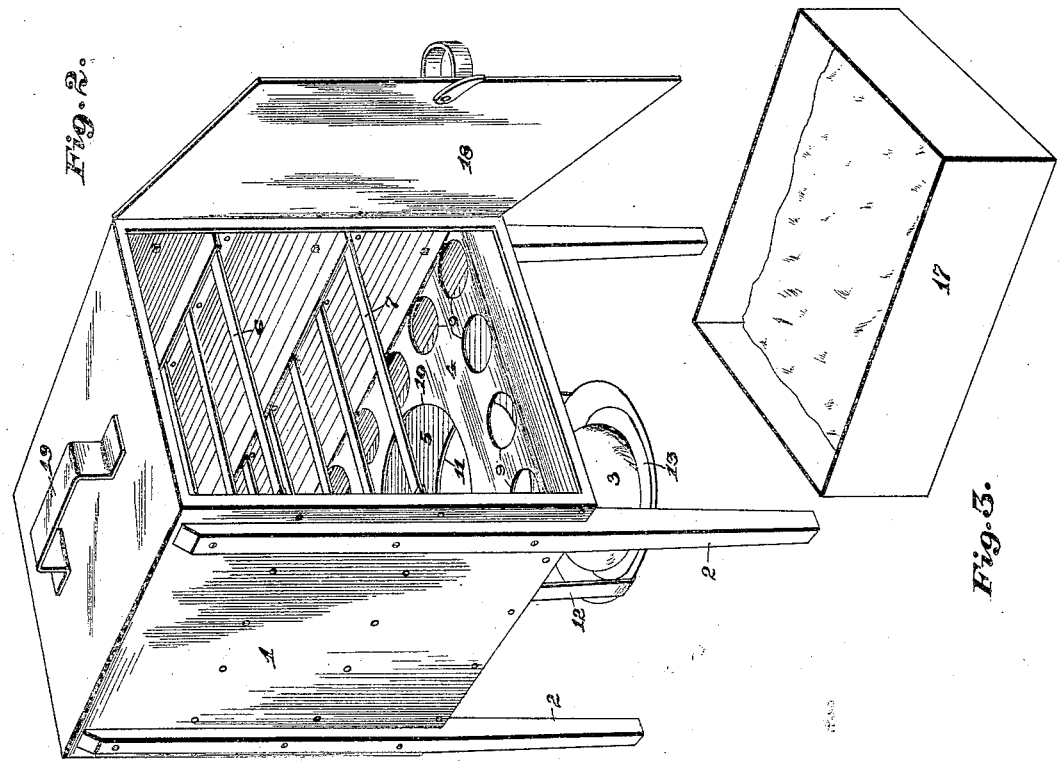
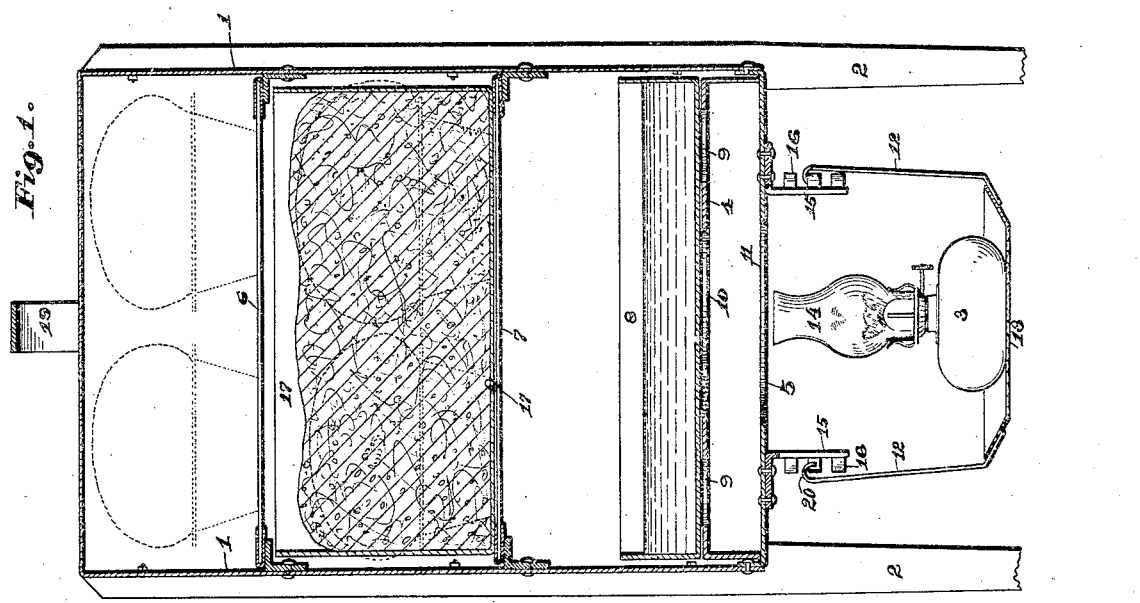
Witnesses
Harry O. Rastetter
Sylvia Boron
Inventor
Jacob M. McIntosh
By Bond & Miller
Attorneys

UNITED STATES PATENT OFFICE.

JACOB M. McINTOSH, OF WARREN, OHIO.

BREAD-RAISER.

No. 931,075.     Specification of Letters Patent.     Patented Aug. 17, 1909.

Application filed February 19, 1908. Serial No. 416,758.

*To all whom it may concern:*

Be it known that I, JACOB M. McINTOSH, a citizen of the United States, residing at Warren, in the county of Trumbull and State of Ohio, have invented certain new and useful Improvements in Bread-Raisers; and I do hereby declare that the following is a full, clear, and exact description of the same, reference being had to the annexed drawing, making a part of this specification, and to the numerals of reference marked thereon, in which—

Figure 1 is a vertical section. Fig. 2 is a perspective view. Fig. 3 is a detached view of one of the dough pans.

The present invention has relation to bread raisers or more specifically speaking for treating dough and it consists in the different parts and combination of parts hereinafter described and particularly pointed out in the claim.

Similar numerals of reference indicate corresponding parts in all the figures of the drawing.

In the accompanying drawing, 1 represents the casing or chamber, which is preferably formed rectangular and of any desired size, which casing is supported by the standards 2, secured in any convenient and well known manner to the casing. These standards 2 will support the chamber or casing 1 in the desired elevation and in such elevation that the lamp 3 can be held in proper relationship with reference to the heat distributing plate 4, and the bottom 5 of the receptacle 1. The heat distributing plate 4 is spaced a short distance from the bottom 5 and is so spaced for the purpose hereinafter described. To the casing 1 are attached the shelves 6 and 7 which shelves are substantially of the form shown and as shown they consist of parallel bars properly connected together to form sufficient support for the various dough pans or receptacles. Above the heat distributing plate 4 is located the water pan 8, which water pan rests directly upon the heat distributing plate 4, and is so located for the purpose of better utilizing heat generated from the lamp 3.

For the purpose of better distributing the heat the heating plate 4 is provided with a series of apertures 9 which apertures are located substantially as shown in the drawings, in Fig. 1. The heating plate 4 and the bottom 5 are provided with the apertures or openings 10, and 11, which apertures are for the purpose of permitting a portion of the heat generated by the lamp striking the bottom of the water pan 8, but by spacing the heating plate 4 from the bottom 5, a heating chamber is provided from which heating chamber some of the heat generated by the lamp will pass through the apertures 9, thereby giving to the water contained in the water pan a more uniform temperature. The lamp 3 is supported by means of the suspending bars 12 and the tray 13.

For the purpose of adjusting the distance between the top of the lamp chimney 14 and the bottom or underside of the bottom 5, the brackets 15 are provided, which brackets are attached to the bottom 5 and are provided with a series of attaching loops 16. It will be understood that by this arrangement I am enabled to regulate the degree of heat required for different stages during the time the dough is rising, that is to say when the dough is in a mass, and after the dough has been kneaded and molded into loaves for the second rising. The adjustability of the lamp tray is to provide for the use of different sized lamps, by which arrangement no specific size of lamp is required. The dough pan 17 is of the usual construction and in use is preferably placed upon the shelf 7. In Fig. 1 I have illustrated in dotted lines dough pans desired to be used for the second rising of the dough, but it will be understood that when the dough pan 17 is in use the dough pans illustrated in dotted lines are not in use.

For the purpose of closing the chamber and retaining the heat the casing 1 is provided with the door 18, which door is of the usual construction. For the purpose of convenience in handling the bread raiser proper the top is provided with the handle 19. For the purpose of providing a means for attaching the suspending rods 12 to the loops the top or upper ends are provided with hooks 20.

Having fully described my invention what I claim as new and desire to secure by Letters Patent, is—

In a dough raiser of the class described, a casing consisting of sides, top and open bottom, the open bottom of said casing provided with brackets having integral spaced loops, a lamp tray provided with hooked sustaining bars adapted to be attached to the series of loops, a heating plate spaced from the open bottom of the casing, said heating plate provided with a series of apertures, a water pan carried by said heating plate and adapted to rest thereon, a series of shelves located within the casing and adapted to
5 carry dough-pans, all arranged substantially as described and for the purpose specified.

In testimony that I claim the above, I have hereunto subscribed my name in the presence of two witnesses.

JACOB M. McINTOSH.

Witnesses:
R. I. GILLMER,
MARY E. TREAT.